US012794834B2

(12) United States Patent
Lindquist

(10) Patent No.: US 12,794,834 B2
(45) Date of Patent: Nov. 10, 2026

(54) DETERMINING THE INTENDED RECIPIENT OF UNDIRECTED UTTERANCES IN A MULTI-BOT CONTEXT

(71) Applicant: Microsoft Technology Licensing, LLC, Redmond, WA (US)

(72) Inventor: Joshua Lindquist, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/528,727

(22) Filed: Dec. 4, 2023

(65) Prior Publication Data

US 2025/0184290 A1 Jun. 5, 2025

(51) Int. Cl.
*H04L 51/02* (2022.01)

(52) U.S. Cl.
CPC .................................... *H04L 51/02* (2013.01)

(58) Field of Classification Search
CPC ....................................................... H04L 51/02
See application file for complete search history.

(56) References Cited

U.S. PATENT DOCUMENTS

2009/0203449 A1* 8/2009 Douceur ................. A63F 13/30 463/42
2018/0040324 A1 2/2018 Wilberding
2018/0293983 A1* 10/2018 Choi ........................ G10L 15/22
2025/0094455 A1* 3/2025 Bista ................... G06F 16/3329

OTHER PUBLICATIONS

International Search Report and Written Opinion received for PCT Application No. PCT/US2024/055287, mailed on Feb. 4, 2025, 14 pages.
International Preliminary Report on Patentability (Chapter I) received for PCT Application No. PCT/US2024/055287, mailed on Jun. 18, 2026, 08 pages.

* cited by examiner

*Primary Examiner* — Soe Hlaing
(74) *Attorney, Agent, or Firm* — Seed Intellectual Property Law Group LLP

(57) ABSTRACT

Technologies described herein relate to a computer-implemented environment that includes multiple bots with which a user can interact. At least one generative model is employed to identify which bot of the multiple bots is to respond to a user communication set forth by the user in the computer-implemented environment.

20 Claims, 10 Drawing Sheets

600

PROMPT

BOT IDENTITIES: BOT 2, BOT 3, ... , BOT N
YOU ARE BOT 1

APPLICATION CONTEXT:
BOT 1 LOCATION
BOT 2 LOCATION

BOT N LOCATION
OBJECT 1 LOCATION

OBJECT M LOCATION

TRANSCRIPT:
USER: XXX XXXXXXXXXXX XXXXXXXX
BOT 1: XXXXXXXXXX XXXXXXXXX
USER: XXX XXXXXXXXX XXXXXXXXXXXXXXX XXXX
BOT 2: XXXXXX XXXXXXXXXXXXX XXXXXXXXXXXXXXXX
USER: XXX XXXXXXXXX XXXXXXXXXXXX XXXXXXXXXXXXX
BOT 1: XXX XXXXXXXXXX XXXXXXXXXXX XXXX
USER: XXXX XXXXXXXXXXXXXXXX XXXX XXXXXX X

INSTRUCTION: DETERMINE WHETHER IT IS APPROPRIATE TO RESPOND TO THE MOST RECENT COMMUNICATION. WHEN IT IS NOT APPROPRIATE TO RESPOND, OUTPUT A NULL VALUE. WHEN IT IS APPROPRIATE TO RESPOND, OUTPUT A RESPONSE TO THE MOST RECENT COMMUNICATION

FIG. 6

DETERMINING THE INTENDED RECIPIENT OF UNDIRECTED UTTERANCES IN A MULTI-BOT CONTEXT

BACKGROUND

There are various computer-implemented technologies that allow a user to interact with bots in a computing environment. Examples of such computer-implemented technologies include, but are not limited to, voice chat, video games, instant messaging, amongst others.

Relatively recently, generative models have been developed, where generative models include generative language models (GLMs) (also referred to as large language models (LLMs)), models that generate images based upon inputs (where the input may be text, voice, an image, etc.), models that generate video based upon input, and so forth. An example of a GLM is the Generative Pre-trained Transformer 4 (GPT-4) model. Another example of a GLM is the BigScience Large Open-science Open-access Multilingual language (BLOOM) model, which is also a transformer-based model. Briefly, a generative model is configured to generate an output (such as text in human-readable language, source code, music, video, and the like) based upon a prompt provided as input to the generative model, where the generative model generates the output in near real-time (e.g., within a few seconds of receiving the prompt).

Computer-implemented applications are being developed to incorporate generative models. For example, a generative model has been incorporated into a search engine chat interface, where a user can interact with a chatbot by way of such interface. The chatbot receives input from the user and provides at least a portion of the input to the generative model; the generative model generates an output based upon the input, and provides the output to the chatbot. The chatbot can then present the user with at least a portion of the output generated by the generative model (where the output can be text, an image, a video, etc.).

In addition, there are computing environments where multiple bots can receive communications from a user and output responses to such communications. In an example, there are numerous video games that involve teams, including (but not limited to) sports video games (e.g., basketball, baseball, hockey, football), militaristic video games (such as the popular game Fortnight®), etc. When there are an insufficient number of human players, or at the request of a user, the team can include several video game bots (where a video game bot is a computer-implemented bot that plays a video game in the place of a human). During play of a video game, however, the user can emit a communication that fails to unambiguously identify an intended recipient of the communication. Typically, the communication is transmitted to each video game bot (that is on the team of the user in the video game), and each video game bot generates a response. There are several problems with this approach. First, the user may be overwhelmed with responses from video game bots when, in actuality, the user intended for only one video game bot to respond. Second, historically video game bots generate communications based upon a relatively small set of predefined rules and have a fairly limited vocabulary, and therefore a relatively small amount of computing resources is consumed in connection with generating outputs for video game bots. As generative models are incorporated into video games, the generative models will generate outputs based upon prompts. Generative models, however, consume a large amount of computing resources when generating outputs, and therefore it is computationally inefficient for each video game bot to respond to each input when the outputs of the video game bots are at least partially generated by generative models.

SUMMARY

The following is a brief summary of subject matter that is described in greater detail herein. This summary is not intended to be limiting as to the scope of the claims.

Various technologies are described herein that pertain to causing a bot to generate an output in a computing environment in response to receipt of user input, where multiple bots are capable of receiving the user input and responding to such user input, and further where the communication fails to unambiguously identify an intended recipient of the user input. The features described herein are particularly well-suited for a video game environment, but it is understood that the features described herein are applicable to other computing environments, such as chat environments.

Pursuant to an example, a video game is being played by a user, where the video game includes two video game bots (Alpha and Bravo) with whom the user can interact in the video game. In an example, at least one generative model is used to generate outputs of the two video game bots. For instance, the user can emit a communication (e.g., by voice of text) that is directed to a video game bot, and the video game bot can present a response to the communication, where the response is at least partially generated by the generative model.

As referenced above, a problem with computing environments that include multiple bots that are able to receive and respond to communications from a user is evident when the user sets forth a communication but does not unambiguously identify the intended recipient, where each bot that can receive input from the user responds to the communications. In an example, the user sets forth the communication "look to your right!", intending for only Alpha to respond. The intended recipient of the communication, however, is ambiguous, resulting in the communication being provided to both Alpha and Bravo, and further resulting in both Alpha and Bravo generating responses to the communication. Various technologies are described herein to address the above-described problem, where the intended recipient of a user communication can be disambiguated.

In a non-limiting example, a computer-executable application (such as a video game) includes a first bot (Alpha) and a second bot (Bravo), each of which are configured to receive communications from a user and respond to communications of the user. The application additionally is in communication with a generative model, where the generative model is tasked with identifying an intended recipient of a communication set forth by the user. Upon receipt of a user communication, the application can review the communication to ascertain whether the communication explicitly identifies an intended recipient bot. When the user communication explicitly identifies the intended recipient, the application directs the user communication (and optionally other information) to the intended recipient bot. When, however, the user communication fails to explicitly identify the intended recipient bot, the application constructs a prompt and provides the prompt to the generative model. The prompt constructed by the application can include, but is not limited to including, the following information: 1) identities of bots to whom the user communication may be directed; 2) previous user communications set forth by the user; 3) previous responses to the user communications output by the bots based upon the previous user communications; and 4) an instruction to identify which of the bots is to receive the user communication. The generative model identifies a bot from amongst the bots (e.g., the generative model identifies Alpha). The application receives the output and directs the user communication to Alpha (but not to Bravo), and Alpha can generate a response based upon the user communication. Hence, the generative model can be employed to identify which bot, from amongst several bots, is to receive the communication.

In another example, each of the bots can include or have access to a generative model. Thus, Alpha can include or have access to a first generative model and Beta can include or have access to a second generative model. The application receives a communication set forth by the user and ascertains whether the communication explicitly identifies an intended recipient bot of the communication. When the communication explicitly identifies the intended recipient bot, the application constructs a prompt and provides the prompt to the intended recipient bot, which in turn provides the prompt to the generative model corresponding to the bot. The prompt can include, but is not limited to including, the user communication, previous user communications (if any), previous communications generated by at least one of the bots (if any), and an instruction for the identified bot to respond to the user communication. When, however, the communication fails to explicitly identify the intended recipient bot, the application can construct several prompts (one prompt for each bot that is configured to respond to communications from the user) and provide the prompts to the bots, which provide the prompts to corresponding generative models. For instance, each prompt can include, but is not limited to including, the user communication, previous user communications (if any), previous communications generated by at least one of the bots (if any), identities of bots that are capable of responding to the user communication, and an instruction that instructs the bot to determine which of the capable bots should respond to the user communication. When the generative model identifies the bot corresponding to the generative model as being the bot that should respond to the message, the generative model generates a response to the user communication. For instance, when the generative model corresponding to the bot determines that the bot should not respond to the user communication upon content in the prompt, the generative model can output a null value or some other value that indicates that the generative model received the prompt and determined that the bot should not respond to the user communication. Alternatively, the generative model can output an identity of the bot that is to respond to the user communication. When, however, the generative model determines that the bot should respond to the user communication based upon the prompt, the generative model generates a response to the user communication and the bot presents the response to the user.

In the examples set forth above, it can be ascertained that not all bots may respond to a user communication, but rather only bots from which a response is appropriate output responses to user communications, thereby providing an improvement over conventional approaches used in computing environments that include multiple bots.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 6 depicts yet another prompt that can be provided by a computer-implemented prompt generator to a generative model.

DETAILED DESCRIPTION

Figure 1:
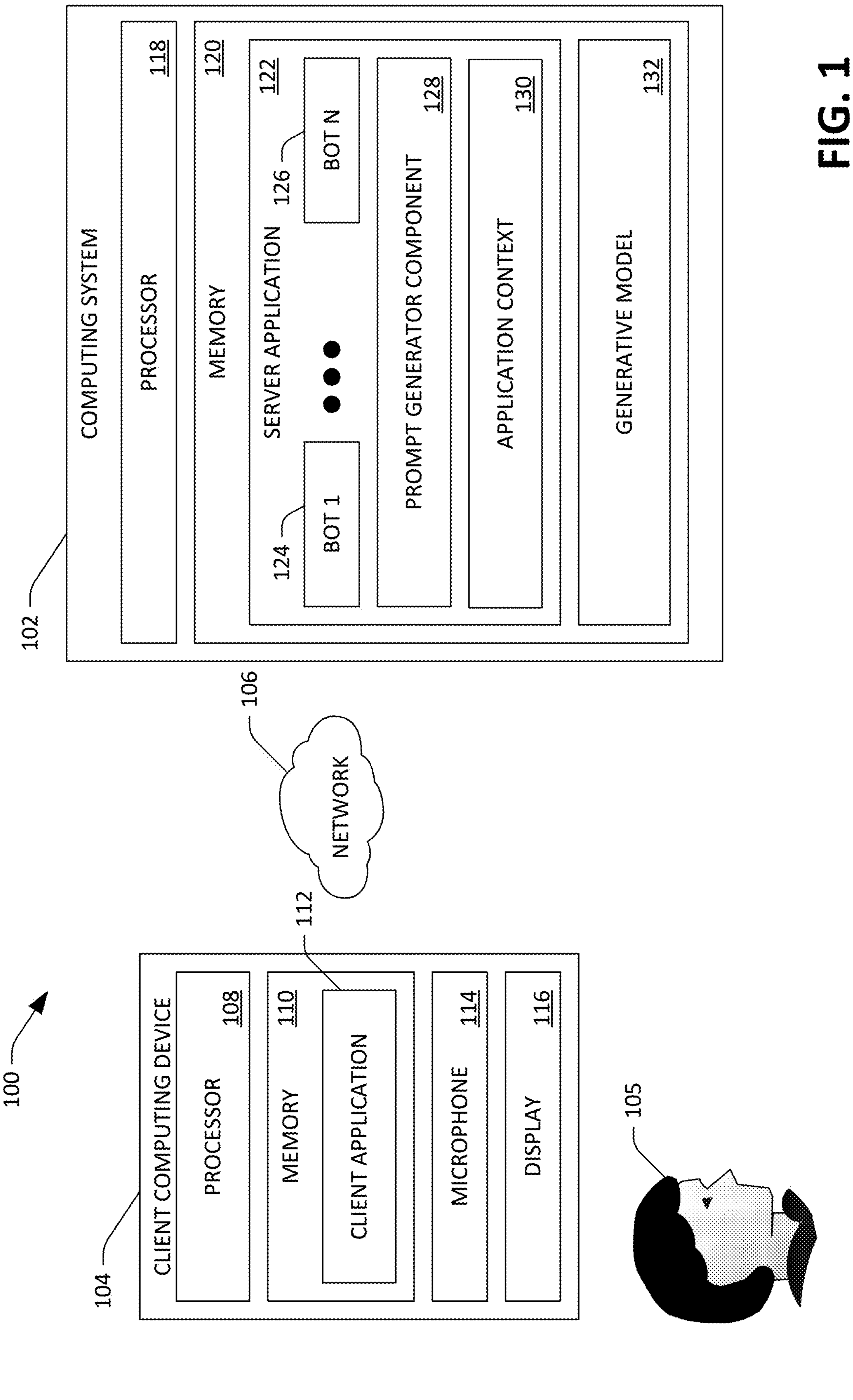
FIG. 1 is a functional block diagram of a computing system that is configured to determine intended recipient bots of undirected utterances in a multi-bot context.

Various technologies pertaining to instructing a generative model, such as a GLM, to determine the intended recipient of an undirected user communication are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

The technologies described herein relate to instructing a generative model, such as a GLM, to determine an intended recipient of an undirected user communication in a multi-bot context. In an example, a generative model can act as a "manager" generative model. The generative model is assigned to identify a bot towards which an undirected input is directed. Therefore, when the generative model receives a prompt that includes the user communication (and other context associated with the user communication) and an instruction to identify a bot from amongst several potential bots towards which the user communication is directed, the generative model can generate an output that identifies the bot from amongst the several potential bots. The identified bot can then be caused to generate a response to the user communication, where the response is presented to the user. In another example, each bot can include or be in communication with an instance of a generative model (conceptually, each bot corresponds to a respective generative model). In such an example, each generative model is provided with a prompt that includes the user communication and an instruction to determine whether the user communication is directed towards the bot that corresponds to the generative model. In another example, the instruction can instruct the generative model to identify which of the bots should respond to the user communication. When the generative model determines that the user communication is directed towards the bot that corresponds to the generative model, the generative model can generate a response to the user communication and the bot can optionally present the response to the user. Therefore, bots towards which user communications are directed present responses to such communications to the user, while bots towards which user communications are not directed remain silent, thereby providing an improvement over conventional approaches.

With reference to FIG. 1, a functional block diagram of a computing environment 100 is illustrated. The computing environment 100 includes a computing system 102 and a client computing device 104 operated by a user 105, where the computing system 102 and the client computing device 104 are in communication with one another by way of a network 106. The client computing device 104 can be any suitable client computing device, including but not limited to a mobile telephone, a desktop computing device, a tablet (slate) computing device, a video game console, a wearable computing device (such as a head-mounted computing device, a watch, smart glasses, or the like), a projector, etc. The client computing device 104 includes a processor 108 and memory 110, where the memory 110 includes a client application 112 that is executed by the processor 108. The client application 112 can or include any suitable client-side application that facilitates user interaction with bots associated with such application 112; thus, the client application 112 can be a browser, a video game, a chat application, a text messaging application, a universal communications (UC) application, or other suitable application. The client computing device 104 can optionally include or be in communication with a microphone 114 that is configured to detect voice input set forth by the user 105. The client computing device 104 additionally optionally includes or is in communication with a display 116, where graphics generated by the client application 112 can be presented on the display 116. In an example, the display 116 is a touch-sensitive display, where the touch-sensitive display is configured to receive touch input from the user 105. In addition, while not shown, the client computing device 104 can optionally include or be in communication with some other device by way of which user input 105 can be received, such as a keyboard, a mouse, a camera (where gestures or gaze direction can be detected), or the like.

The computing system 102 includes a processor 118 and memory 120, where the memory 120 stores instructions that are executed by the processor 118. With more specificity, the memory 120 includes a server application 122 that is in communication with the client application 112; for instance, the server application 122 can be a backend video game application, a backend chat application, a backend UC application, etc. While the computing environment 100 depicts a client-server architecture with respect to the applications 112 and 122, it is to be understood that such architecture is set forth as an example. In another example, the entirety of the application can be executed at the client computing device 104.

The server application 122 includes several bots 124-126 with which the user 105 can interact. In a video game context, the bots 124-126 are video game bots that can represent players in the video game (optionally in the place of humans). Therefore, for instance, when the video game is a basketball game, the bots 124-126 can be basketball players in the video game. In another example, when the video game is a militaristic video game, the bots 124-126 are members of a regiment. When the server application 122 is a chat application, the bots 124-126 can be chatbots with which the user 105 can interact (e.g., the bots 124-126 can have distinct personalities, can have genders assigned thereto, can have ages assigned thereto, etc.).

The server application 122 further includes a prompt generator component 128 that generates prompts that can be provided to a generative model (as will be discussed later). The server application 122 further retains application context 130, where the application context 130 can include previous user communications set forth by the user 105 to the client application 112, previous responses output by the bots 124-126, state information of the server application 122, etc. For instance, state information of the server application 122 can include video game context, such as locations of players (including a player representing the user 105 and the bots 124-126) in an environment of the video game, locations of objects in the environment of the video game, or any other suitable video game context.

The memory 120 further includes a generative model 132. While the generative model 132 is illustrated as being included in the same memory 120 that includes the server application 122, in another example the generative model 132 executes in a computing system that is separate from the computing system 102. In yet another example, the generative model 132 can be a relatively lightweight generative model and can be executed by the client computing device 104. The generative model 132 can be a transformer-based model. Therefore, the generative model 132 can be a generative language model (GLM) that is configured to receive a prompt that includes text and generate a textual output based upon the prompt. In other examples, the generative model 132 can generate audio, images, video (with audio) or other suitable outputs based upon a variety of encoded inputs, such as voice, text, video, images, audio, etc. As will be described in greater detail herein, the generative model 132 is configured to identify at least one bot from amongst the bots 124-126 that is to respond to a user communication set forth by the user 105.

Operation of the computing environment 100 is now set forth. The processor 108 of the client computing device 104 executes the client application 112. In an example, the client application 112 is client-side software for a video game, although technologies described herein are not limited to video games. During play of the video game, the client application 112 receives a user communication set forth by the user 105, where the user communication 105 is directed towards at least one of the bots 124-126. The client application 112 causes the client computing device 104 to transmit the user communication to the computing system 102 by way of the network 106, whereupon the user communication is provided to the server application 122. The server application 122 is configured to parse content of the user communication to ascertain whether the user communication explicitly identifies one of the bots 124-126. For instance, the first bot 124 can be "Alpha" while the second bot can be "Bravo." In an example, the user communication can be "Alpha, move to the left." The server application 122 parses the user communication and ascertains that the communication is directed towards Alpha. The server application 122 can cause the first bot 124 to generate a response (e.g., "Understood-moving to the left") to the user communication upon determining that the user communication is directed towards Alpha. The server application 122 causes the computing system 102 to transmit the response to the client computing device 104, whereupon the response is presented to the user 105 by way of the display 116 (or audibly output by way of a speaker).

Subsequent to the response being presented to the user 105, the client application 112 receives a second user communication (e.g., "further left"). The client application 112 causes the client computing device 104 to transmit the second user communication to the computing system 102, and the second user communication is provided to the server application 122. The server application 122 parses the second user communication and determines that the second user communication does not explicitly identify a bot from amongst the bots 124-126 that is to respond to the second user communication. Upon the server application 122 determining that the second user communication does not explicitly identify a bot from amongst the bots 124-126 that is to respond to the second user communication, the prompt generator component 128 constructs a prompt that is to be provided to the generative model 132. In an example, the prompt generator component 128 constructs the prompt based upon the application context 130; accordingly, the prompt can include a transcript that includes identities of issuers of messages, content of the messages, times that the messages were set forth, etc. In addition, the prompt can include other contextual information pertaining to the application, such as locations of objects within a video game environment, locations of characters in the video game environment, direction of a gaze of the user 105 with respect to objects and/or characters in the video game, and so forth. Further, the prompt generator component 128 includes an instruction in the prompt, where the instruction instructs the generative model to identify which, if any, of the bots 124-126 that are to respond to received user communication.

Once the prompt generator component constructs the prompt, the server application 122 provides the prompt to the generative model 132. The generative model 132, based upon the prompt, generates an output, where the output identifies at least one bot in the bots 124-126 that are to respond to the user communication. The server application 122 receives the output and provides the user communication to the bot(s) identified in the output of the generative model 132. Continuing with the example set forth above, the generative model 132 generates an output that indicates that Alpha is to respond to the user communication "further left." The server application 122 receives the output and, based upon such output, provides the user communication to the first bot 124 (while refraining from providing the user communication to the Nth bot 126). The first bot 124 ("Alpha") can then generate a response to the user communication, and the server application 122 causes the computing system 102 to transmit the response to the client computing device 104.

It can be ascertained that in some situations, it is appropriate for multiple bots to respond to a user communication—for instance, the user can set forth the communication "everyone to my left, report your position." The generative model 132 can generate an output that identifies several bots in the bots 124-126, and the server application 122 can provide such user communication to appropriate bots in the bots 124-126.

In another example, while not illustrated, the bots 124-126 can correspond to separate generative models (or separate instances of a generative model). Thus, for instance, the first bot 124 can correspond to a first generative model, where the first generative model generates responses (when appropriate) on behalf of the first bot 124, while the nth bot 126 can correspond to an nth generative model, where the nth generative model generates responses (when appropriate) on behalf of the nth bot 126. Accordingly, upon the server application 122 receiving an output of the generative model 132 that identifies the first bot 124, the prompt generator component 128 can construct a prompt that is to be provided to the first bot 124 and thus to the first generative model. The prompt can include the user communication, previous messages output by the first bot 124, previous messages output by other bots, and an instruction for the first bot 124 to generate a response to the user communication. The first generative model generates the response, and the first bot 124 outputs the response for presentment to the user 105. In such an example, the response can be a textual response, an audio response, a video response, or the like. In yet another example, the response can be a command stream that instructs the first bot 124 to act in a manner specified in the command stream (e.g., change position in a video game environment, perform some action, etc.).

To conserve computing resources, the prompt generator component 128 can optionally include an instruction in the prompt provided to the generative model 132 for the generative model 132 to generate an output that allows for the identified bot to respond appropriately. For example, a transcript of communications amongst and between the user 105 and the bots 124-126 can be relatively long, with several portions thereof being irrelevant to the most recent user communication set forth by the user 105. The instruction in the prompt can instruct the generative model 132 to summarize the communications and/or identify information in the prompt that is relevant for the identified bot to create a response. The server application 122 receives such output, and the prompt generator component 128 includes the output in the prompt that is provided to the identified bot (e.g., the first bot 124).

Still further, while the examples set forth above have pertained to bots responding to user communications, the technologies are applicable with respect to bots responding to communications from other bots. For example, the first bot 124 can output a bot communication, the prompt generator component 128 can construct a prompt that includes the bot communication (and other relevant information) and an instruction to identify which of the bots 124-126 should respond to the bot communication. The prompt generator component 128 can provide the prompt to the generative model 132, and the generative model 132 (in an example) generates an output that indicates that the nth bot 126 should respond to the bot communication set forth by the first bot 124. The server application 122 can then provide the bot communication (and potentially other information) to the nth bot 126, whereupon the nth bot generates and outputs a response to the bot communication.

From the foregoing description, it can be readily ascertained that the technologies described herein exhibit various advantages over conventional technologies for computing systems where a user can communicate with multiple bots. Rather than all bots responding to a user communication (even when responses from some bots may be inappropriate), the technologies described herein allow for automatic determination of at least one bot from amongst several bots that is to respond to a user communication. These technologies improve user experience, as multiple bots do not generate irrelevant or undesired output. Such technologies further conserve computing resources, as only bots that should respond to a user communication actually respond to the user communication, rather than all bots.

Figure 2:
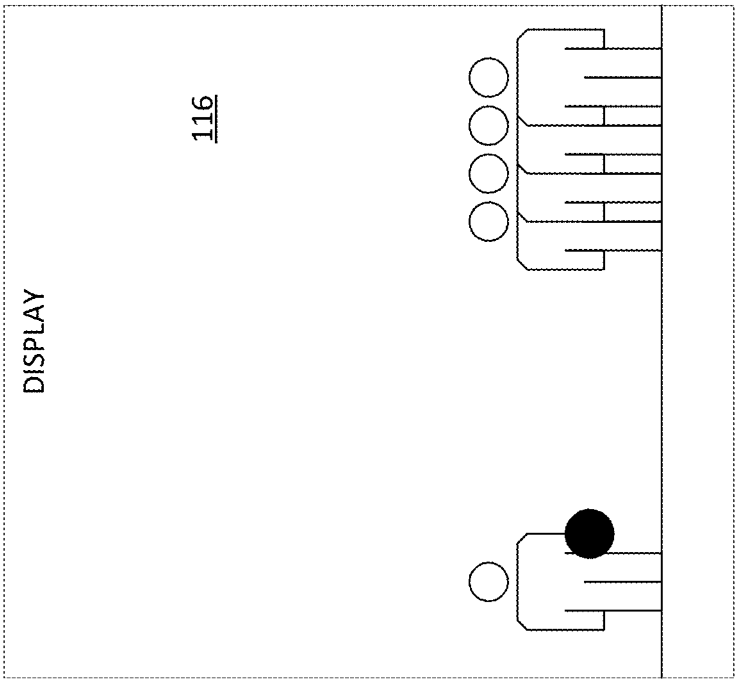
FIG. 2 is a functional block diagram of a client computing system.

Now referring to FIG. 2, a schematic 200 depicting example content that can be presented on the display 116 is presented. The display 116 can depict a virtual environment rendered by the client application 112. In an example, the virtual environment is sports arena. The virtual environment includes four characters that correspond to four different bots, as well as a character that is controlled in the virtual environment by the user 105 through use of the client computing device 104. One of the bots asks the character controlled by the user 105 for a ball being held by the character. The user 105 can affirmatively respond to the bot with an undirected input (e.g., a vocal response, such as "Sure, you can have the ball."). The input is received by the client application 112 and transmitted to the computing system 102, where the input is provided to the prompt generator component 128. The prompt generator 128 generates a first prompt, the first prompt including first instructions to identify at least one bot to which the input is directed. The first prompt is provided to the generative model 132, where the generative model 132 generates a first output indicating that the input is directed towards the bot that asked for the ball. The server application 122 receives the first output and instructs the bot to which the input is directed to respond. The bot can generate a second output that is responsive to the input from the user (e.g., "Thank you for the ball!"). The second output can be audibly emitted or displayed on the display 116.

Figure 3:
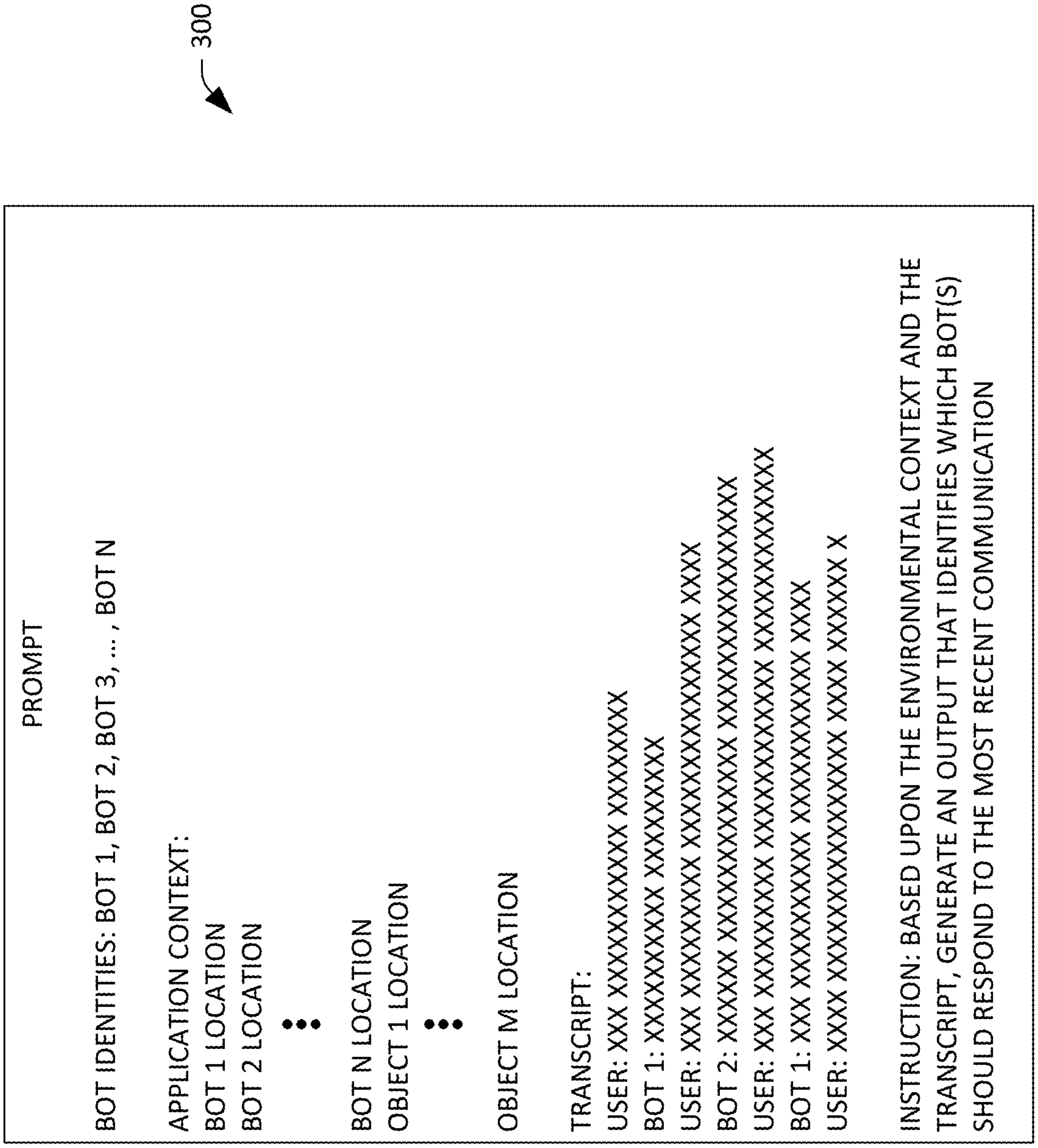
FIG. 3 depicts a prompt that can be provided by a computer-implemented prompt generator to a generative model.

With reference to FIG. 3, a prompt 300 output by the prompt generator 128 is depicted. The prompt 300 includes information pertaining to context of a group (e.g., the user 105 and the bots 124-126) as well as context of the server application 122. As described above, the prompt generator 128 generates the prompt 300, where the prompt 300 includes identities of bots that are capable of responding to communications, application context (including locations of characters corresponding to the bots, locations of objects in a virtual environment, amongst other contextual data), and so forth. The prompt 300 can further include a transcript that includes messages exchanged between the user and bots and/or between the bots. Moreover, the prompt 300 includes an instruction that instructs the generative model 132 to generate an output that identifies which of the bots 124-126 (if any) should respond to the most recent communication (e.g., user communication).

Figure 4:
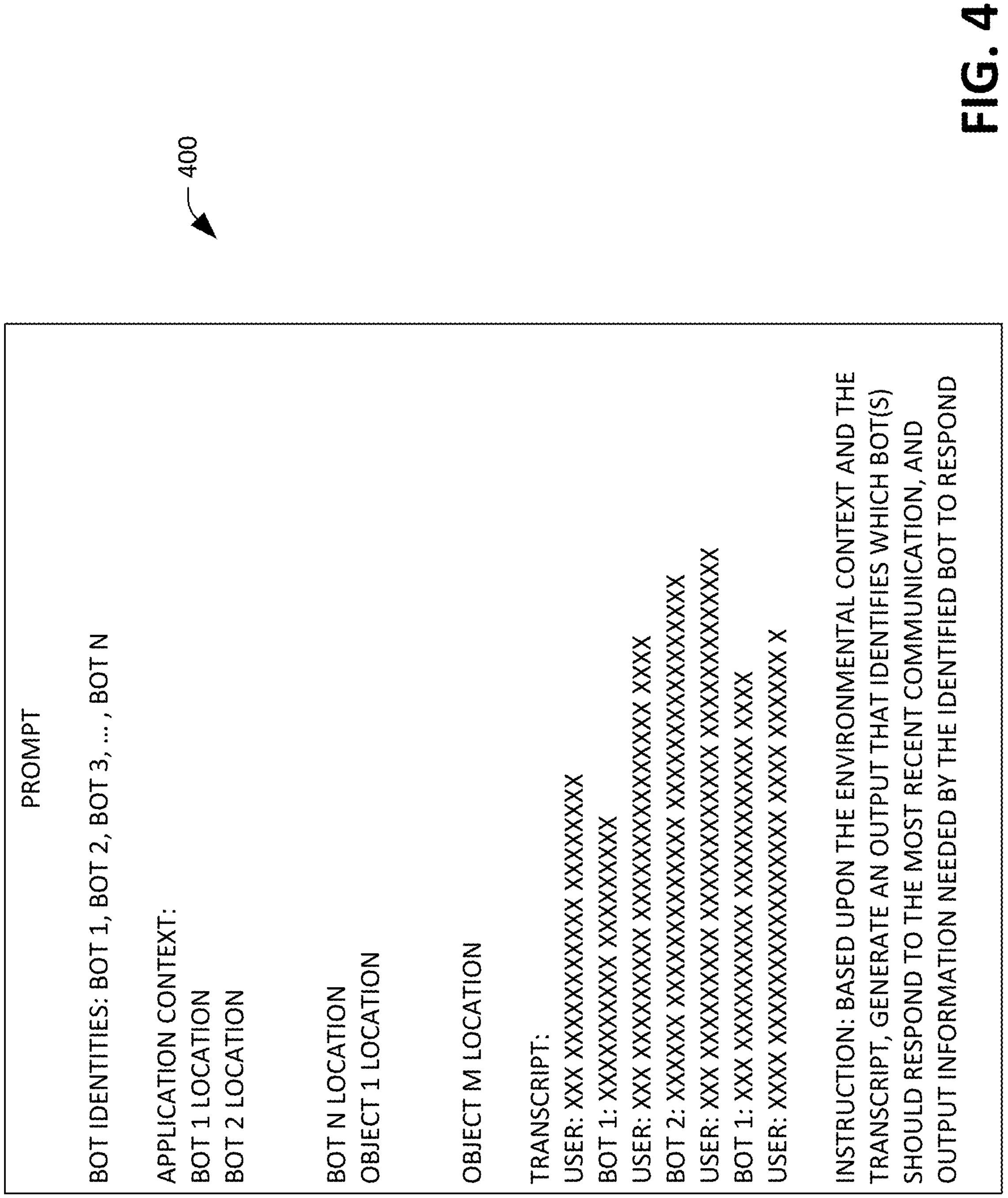
FIG. 4 depicts another prompt that can be provided by a computer-implemented prompt generator to a generative model.

Turning to FIG. 4, another example prompt 400 output by the prompt generator 118 is depicted. In this example, the generative model 132 is tasked with not only identifying the bot that is to respond, but is also tasked with identifying and/or creating information that can be used by a generative model corresponding to the identified bot to generate an appropriate response. As indicated in FIG. 4, the instruction identifies two tasks that are to be performed by the generative model 132:1) identify the bot that is to respond to the most recent communication; and 2) output information needed by the identified bot to respond. The generative model 132, in response to receiving the prompt 400, can summarize content of the transcript, filter out information that is not needed by the identified bot to create a response, and so forth.

In a still further alternative embodiment, the instructions in the prompt 400 can instruct the generative model 132 to generate a summary of information in the prompt (e.g., a summary of the transcript, a summary of contextual information, etc.). The generative model 132 generates the summary, which is obtained by the prompt generator component 128. The prompt generator component 128 can then construct a respective prompt for each generative model that corresponds to the bots 124-126, where a prompt constructed by the prompt generator component 128 can include the summary generated by the generative model 132 as well as an instruction for the generative model corresponding to a bot to determine whether the bot should respond based upon content of the prompt. Therefore, rather than the generative model 132 ascertaining which bot should respond to the user communication, each bot is tasked with determining whether the bot should respond to the user communication (based upon output of the generative model 132).

Figure 5:
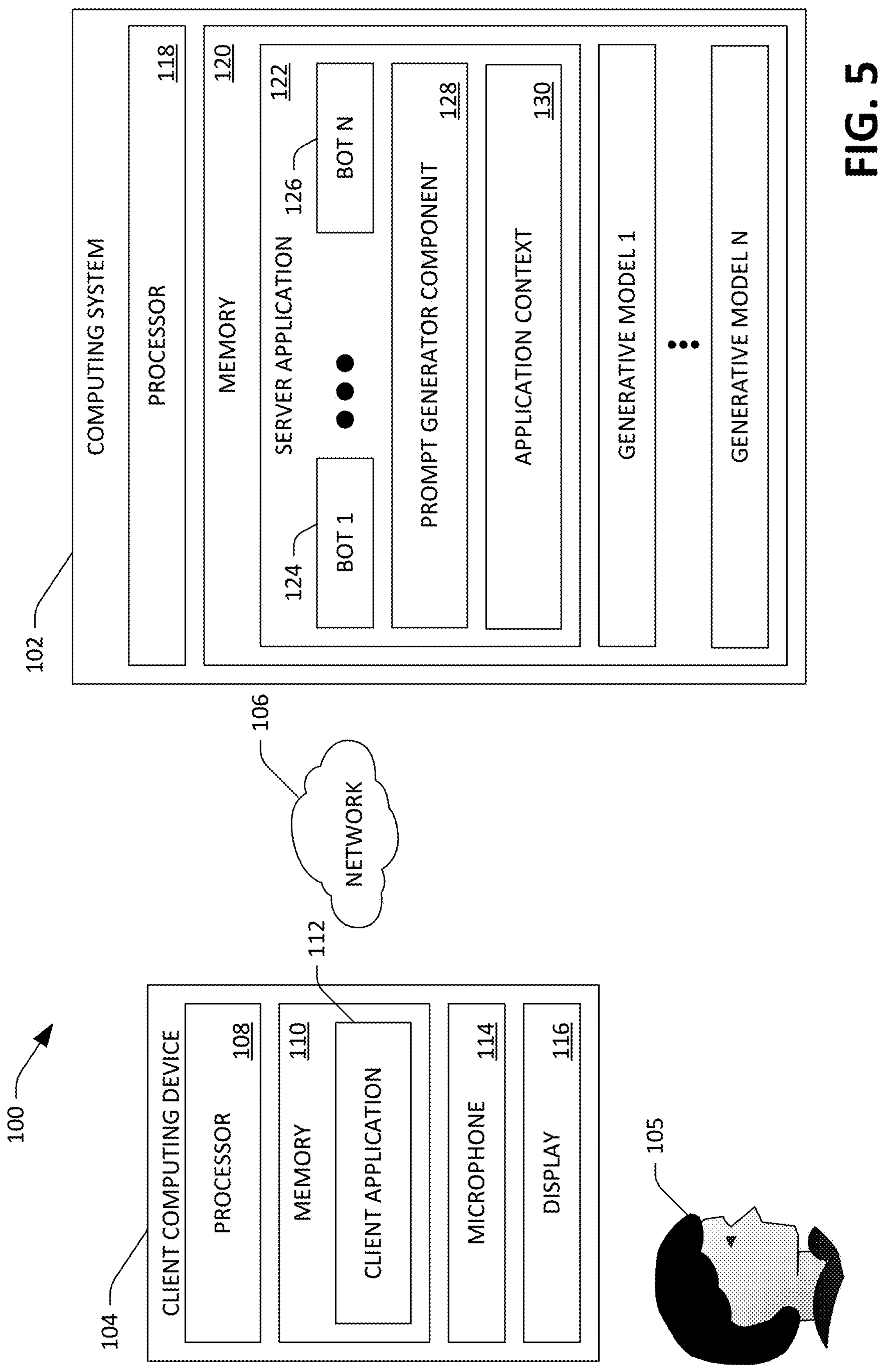
FIG. 5 is a functional block diagram of another computing system that determines the intended recipient of undirected utterances in a multi-bot context.

Referring now to FIG. 5, a functional block diagram of a computing environment 500 is illustrated. The computing environment 500 includes the computing system 102 and the client computing device 104. In the environment 500, rather than the computing system 102 including the generative model 132 that is tasked with identifying which of the bots 124-126 is to respond to a most recent user communication, the memory 120 includes several generative models 502-504 that respectively correspond to the bots 124-126. Thus, the first generative model 502 is configured to generate outputs for the first bot 124 while the nth generative model 504 is configured to generate outputs for the nth bot 126.

Further, in the example illustrated in FIG. 5, the prompt generator component 128 is configured to generate n prompts each time that a user communication that does not explicitly identify an intended recipient is received, where the prompt generator component 128 constructs a first prompt and provides the first prompt to the first generative model 502 and constructs an nth prompt and provides the nth prompt to the nth generative model 504. Each prompt constructed by the prompt generator component 128 can be based upon the application context 130 and can include a transcript of communications between the user 105 and the bots 124-126, locations of the bots 124-126 in a virtual environment, location of the user 105 (or a character controlled by the user 105) in the virtual environment, direction of gaze of the user 105, and so forth. Each prompt can also include an instruction that requests that the respective generative model determine whether or not it is appropriate for the bot corresponding to the generative model to respond. In another example, each prompt can include an instruction that requests that the respective generative model identify which of the bots 124-126 should respond.

Thus, in an example, the prompt generator component 128, in response to receiving a user communication, can construct a first prompt for the first bot 124, where the first prompt includes an instruction for the first generative model 502 to determine whether the first bot 124 should respond to the user communication (and optionally identify which of the bots 124-126 should respond to the user communication). The first prompt can also instruct the first generative model 502 to generate a response when the first generative model 502 determines that the first bot 124 should respond to the user communication and to generate a null output (or some other suitable output) when the first generative model 502 determines that the first bot 124 should not respond to the user communication. The prompt generator component 128 additionally constructs an nth prompt for the nth bot 126, where the nth prompt includes an instruction for the nth generative model to determine whether the nth bot 126 should respond to the user communication (and optionally identify which of the bots 124-126 should respond to the user communication). The nth prompt can also instruct the nth generative model 504 to generate a response when the nth generative model 504 determines that the nth bot 126 should respond to the user communication and to generate a null output (or some other suitable output) when the nth generative model 504 determines that the nth bot should not respond to the user communication.

Accordingly, in contrast to the approach described with respect to FIG. 1, each bot 124-126 independently determines whether or not the bot should respond (rather than having the generative model 132 generate an output that identifies which bot(s) are to respond). More specifically, each bot has a generative model corresponding thereto, and the generative model corresponding to a bot is tasked to ascertain whether the bot should respond to a user communication.

Referring now to FIG. 6, an example prompt 600 for the first generative model 502 constructed by the prompt generator component 128 is depicted. The prompt 600 includes identities of other bots that exist in the virtual environment, as well as an indication that the prompt is to be provided to a generative model that corresponds to the first bot 124. The prompt 600 includes application context, such as locations of bots in the virtual environment, location of a character controlled by the user 105 in the virtual environment, locations of objects in the virtual environment, and so forth. The prompt 600 further includes a transcript of communications between the user 105 and the bots 124-126.

Finally, the prompt 600 includes an instruction for the first generative model 502. The instruction instructs the first generative model 502 to ascertain whether the first bot 124 should respond to the most recent communication in the transcript. The instruction further instructs the first generative model 502 to output a null value when the first generative model 502 determines that the first bot 124 should not respond to the most recent communication. Conversely, the instruction instructs the first generative model 502 to generate a response when the first generative model 502 determines that the first bot 124 should respond to the most recent communication in the transcript.

The prompt 600 can also optionally include other information that is instructive for the first generative model 502 when generating responses. For example, the prompt can identify an age, a personality, a gender, etc. of the first bot 124; such information can be used to determine whether it is appropriate for the first bot 124 to respond and can further be used when generating a response (such that the first bot 124 has a particular vocabulary or outputs a response having a certain tone).

Figure 7:
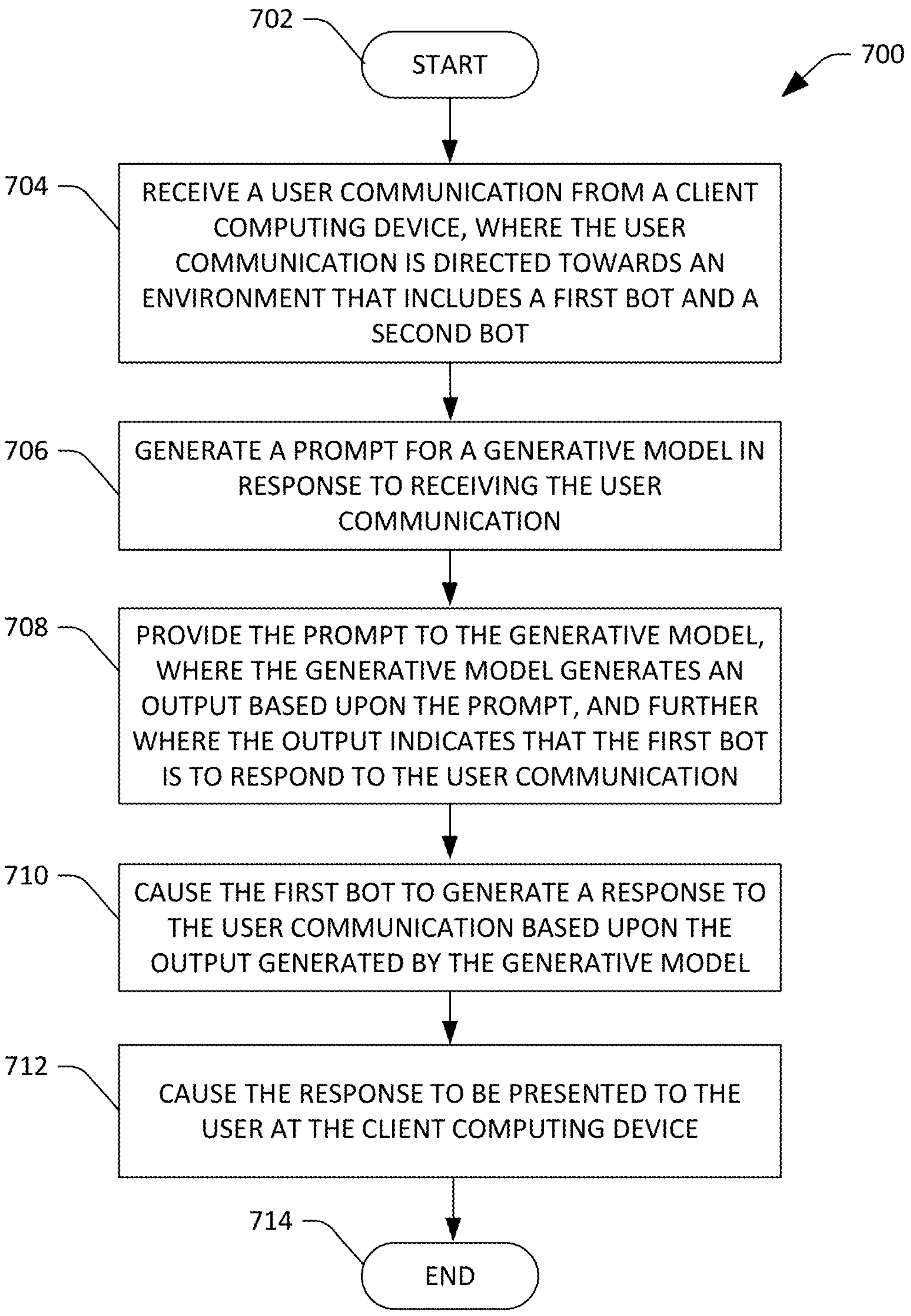
FIG. 7 is a flow diagram depicting a method pertaining to determining the intended recipient of an undirected utterance in a multi-bot context.
Figure 8:
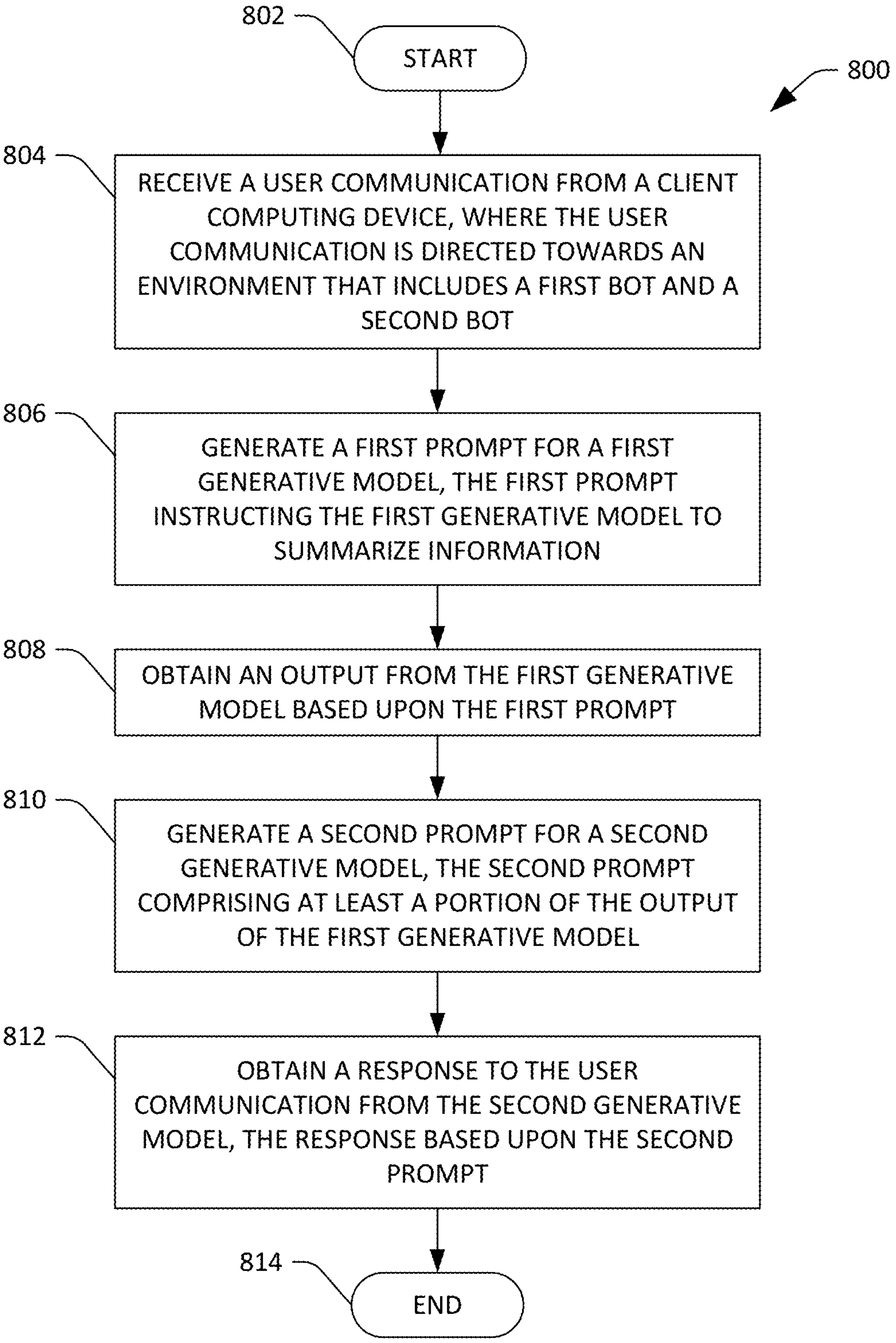
FIG. 8 is a flow diagram depicting a method pertaining to constructing a prompt that is to be provided to a bot that has a generative model corresponding thereto.
Figure 9:
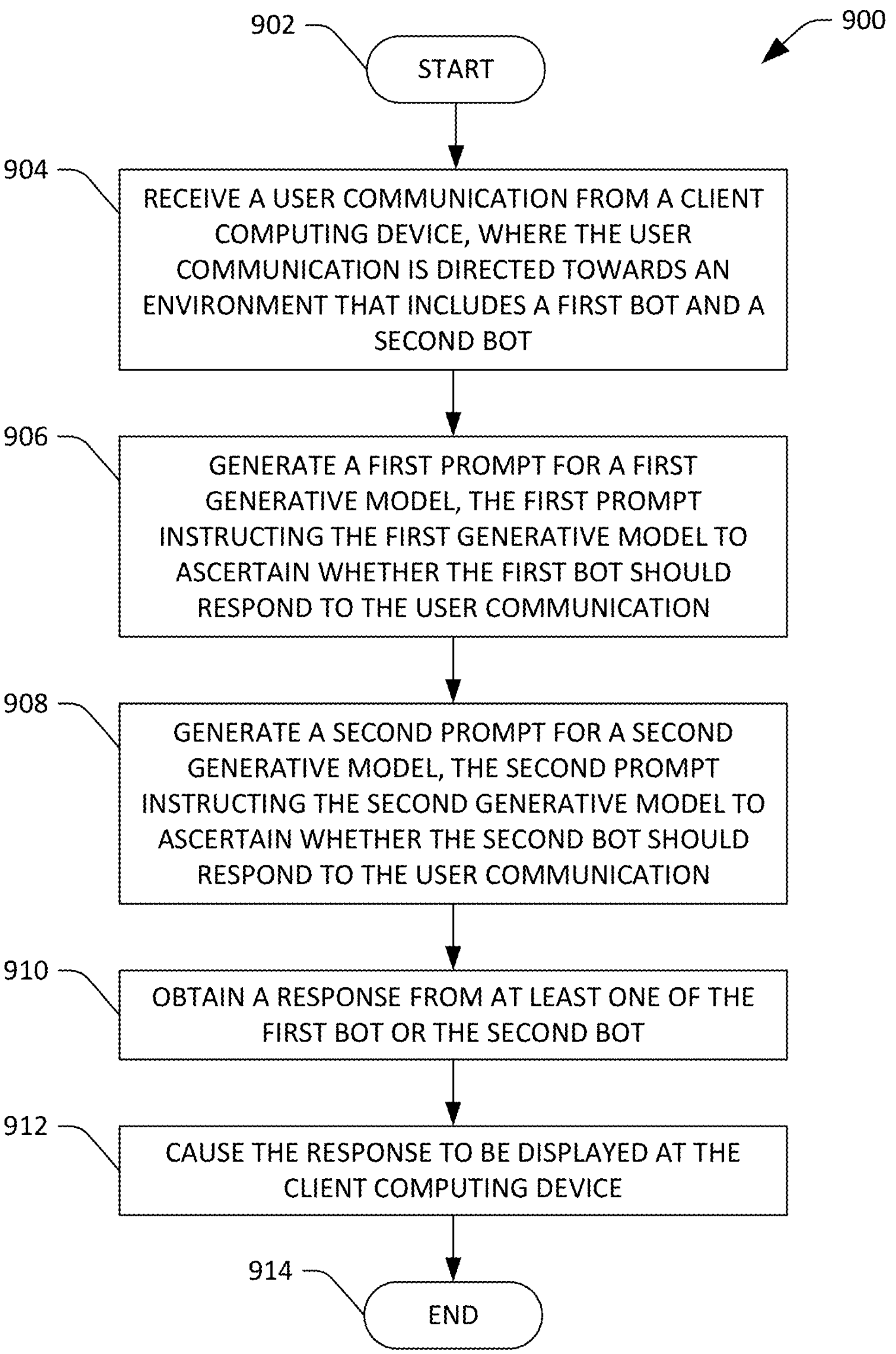
FIG. 9 is a flow diagram depicting a method pertaining to determining an intended recipient of an undirected utterances in a multi-bot context.

FIGS. 7-9 illustrate methods relating to bots responding to communications in a virtual environment. While the methods are shown and described as being a series of acts that are performed in a sequence, it is to be understood and appreciated that the methods are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, a flow diagram illustrating a method 700 related to a bot responding to a user communication is shown. The method 700 begins at 702, and at 704 a user communication is received from a client computing device, where the user communication is directed towards an environment that includes a first bot and a second bot, and further where the user communication fails to explicitly identify whether the user communication is directed towards the first bot or the second bot. At 706, a prompt for a generative model is generated in response to receiving the user communication. The prompt can include the user communication and an instruction, where the instruction instructs the generative model to identify at least one of the first bot or the second bot that is to respond to the user communication At 708, the prompt is provided to the generative model. Provision of the prompt to the generative model causes the generative model to generate an output based upon the prompt, where the output indicates that the first bot is to respond to the user communication. At 710, the first bot is caused to respond to the user communication based upon the output generated by the generative model. For example, at least the user communication is provided to the first bot. In another example, a second generative model corresponds to the first bot, and the second generative model is provided with a second prompt, where the second prompt includes the user communication and an instruction that instructs the second generative model to generate a response to the user communication. At 712, the response to the user communication is caused to be presented to the user at the client computing device. The response is presented in such a manner to indicate that the response is from the first bot. The method 700 completes at 714.

Referring now to FIG. 8, a flow diagram illustrating a method 800 for providing a response to a user communication in a multi-bot environment is presented. The method 800 begins at 802, and at 804, a user communication is received from a client computing device, where the user communication is directed towards a virtual environment that includes multiple bots (e.g., a first bot and a second bot, either of which is able to respond to the user communication). At 806, a first prompt is generated for a first generative model based upon the received user communication. The first prompt includes the received user communication and an instruction for the first generative model to summarize contextual information that pertains to the user information, where the contextual information can include other messages transmitted between the user and the bots, application state information, etc.

At 808, an output from the first generative model is obtained, where the output is based upon the first prompt, and further where the output includes a summarization of the contextual information referenced above. At 810, a second prompt for a second generative model is generated, where the second generative model corresponds to the first bot, and further where the second prompt includes at least a portion of the output generated by the first generative model. At 812, a second output is obtained from the second generative model, where the second output is based upon the second prompt, and further where the second output includes a response to the user communication. While not shown, optionally, a third prompt can be generated for a third generative model that corresponds to the second bot, where the third prompt includes at least a portion of the output generated by the first generative model. In an example, the third generative model outputs a null value (rather than a response to the user communication). The method 800 completes at 814.

Referring now to FIG. 9, a flow diagram illustrating a method 900 for responding to a user communication in a multi-bot environment is shown. The method 900 begins at 902, and at 904 a user communication is received from a client computing device, where the user communication is directed towards an environment that includes a first bot and a second bot. At 906, a first prompt for a first generative model is generated. The first prompt instructs the first generative model to ascertain whether the first bot should respond to the user communication. At 908, and substantially simultaneously with 906, a second prompt for a second generative model is generated. The second prompt instructs the second generative model to ascertain whether the second bout should respond to the user communication.

At 910, a response is obtained from at least one of the first bot or the second bot. Specifically, when the first generative model ascertains that the first bot should generate a response, the first generative model can generate the response for the first bot. Similarly, when the second generative model ascertains that the second bot should generate a response, the second generative model can generate the response for the second bot. At 912, the response obtained at 910 is caused to be displayed at the client computing device. The method 900 completes at 914.

Figure 10:
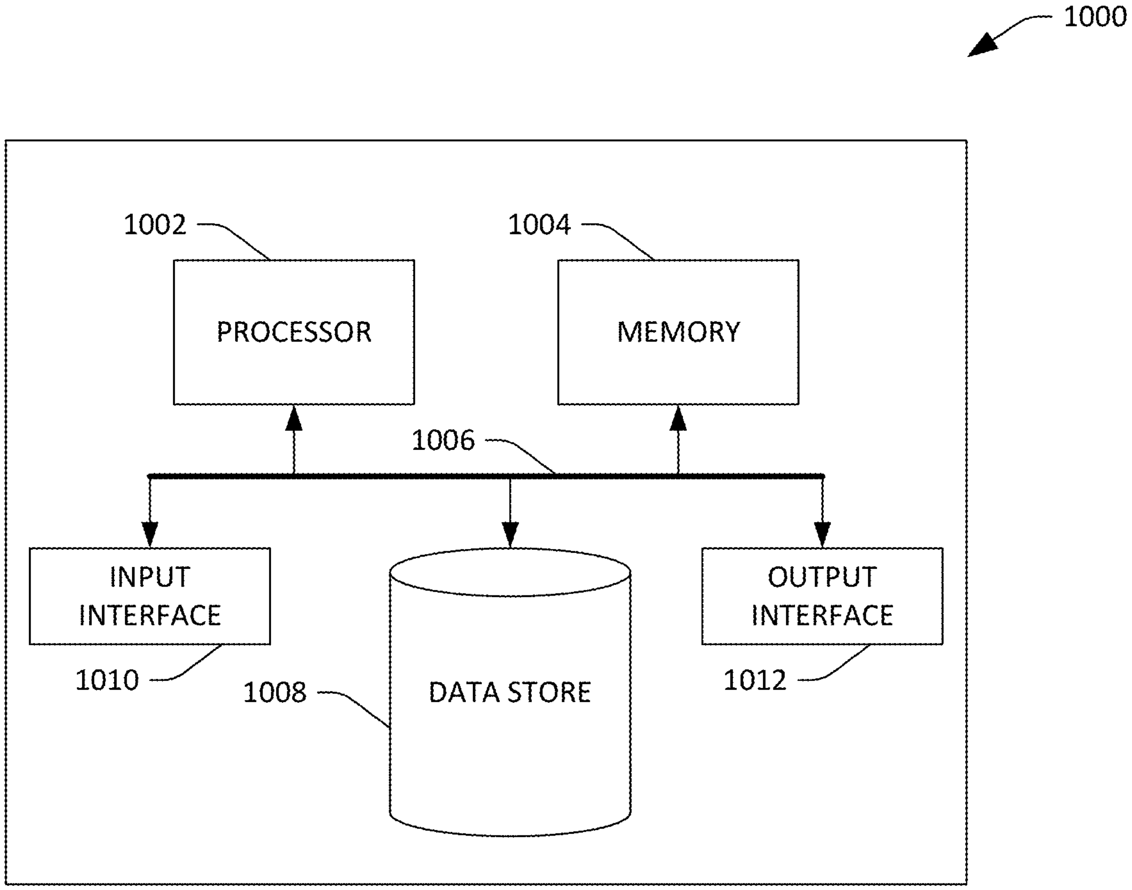
FIG. 10 is a schematic of a computing device.

Referring now to FIG. 10, a high-level illustration of a computing device 1000 that can be used in accordance with the systems and methodologies disclosed herein is illustrated. For instance, the computing device 1000 can be a client computing device that is employed by a user. By way of another example, the computing device 1000 can be a server computing system that executes a generative model. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store communication transcripts, locations of bots in a virtual environment, etc.

The computing device 1000 additionally includes a data store 1008 that is accessible by the processor 1002 by way of the system bus 1006. The data store 1008 may include executable instructions, prompts, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 2000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Various aspects are described herein in accordance with at least the following examples.

(A1) In an aspect, a method is described herein, where the method includes receiving a user communication set forth by a user of a client computing device, where the user communication is directed towards an environment that includes a first bot and a second bot. The method also includes generating a prompt in response to receiving the user communication, where the prompt includes an instruction to identify at least one bot to which the user communication is directed. The method further includes providing the prompt to a generative model, where the generative model generates an output based upon the prompt, and further where the output indicates that the user communication is directed to the first bot. The method additionally includes causing the first bot to generate a response to the user communication, where the response is caused to be presented to a user of the client computing device as being provided by the first bot.

(A2) In some embodiments of the method of (A1), the output additionally indicates that the user communication is directed to the second bot. The method also includes causing the second bot to generate a second response to the user communication, where the second response is caused to be presented to the user of the client computing device as being provided by the second bot.

(A3) In some embodiments of the method of (A1), the output indicates that the user communication is not directed to the second bot.

(A4) In some embodiments of the method of at least one of (A1)-(A3), the prompt includes: a) the user communication; and b) a previous user communication set forth by the user of the client computing device.

(A5) In some embodiments of the method of at least one of (A1)-(A3), the prompt includes: a) the user communication; and b) at least one message previously set forth by the first bot.

(A6) In some embodiments of the method of at least one of (A1)-(A3), the prompt includes: a) the user communication; and b) at least one message previously set forth by the second bot.

(A7) In some embodiments of the method of at least one of (A1)-(A6), the prompt includes: a) contextual data; and b) a second instruction to summarize the contextual data.

(A8) In some embodiments of the method of at least one of (A1)-(A7), a second generative model corresponds to the first bot. The method also includes subsequent to providing the prompt to the generative model, constructing a second prompt, where the second prompt includes the user communication. The method further includes providing the second prompt to the second generative model, where the second generative model generates the response based upon the user communication in the second prompt.

(A9) In some embodiments of the method of (A8), the second prompt additionally includes a previous user communication set forth by the user of the client computing device.

(A10) In some embodiments of the method of (A1), the user communication fails to identify either the first bot or the second bot.

(A11) In some embodiments of the method of at least one of (A1)-(A10), the environment is a video game environment.

(A12) In some embodiments of the method of at least one of (A1)-(A10), the environment is a chat environment.

(A13) In some embodiments of the method of at least one of (A1)-(A10), the prompt additionally includes locations of the first bot and the second bot in a virtual environment (B1) In another aspect, a method described herein includes receiving a user communication from a client computing device, where the user communication is directed towards an environment that includes a first bot and a second bot. The method also includes generating a prompt for a generative model that corresponds to the first bot, where the prompt is generated in response to receipt of the user communication, and further where the prompt includes an instruction to ascertain whether the first bot should respond to the user communication. The method further includes providing the prompt to the generative model, where the generative model generates a response to the user communication based upon the prompt. The method additionally includes causing the response to be presented to a user of the client computing device as being output by the first bot.

(B2) In some embodiments of the method of (B1), the method also includes generating a second prompt for a second generative model that corresponds to the second bot, where the second prompt is generated in response to receipt of the user communication, and further where the second prompt includes a second instruction to ascertain whether the second bot should respond to the user communication. The method further includes providing the second prompt to the second generative model, where the second generative model generates a second response to the user communication. The method additionally includes causing the second response to be presented to the user of the client computing device as being output by the second bot.

(B3) In some embodiments of the method of (B1), the method also includes generating a second prompt for a second generative model that corresponds to the second bot, where the second prompt is generated in response to receipt of the user communication, and further where the second prompt includes a second instruction to ascertain whether the second bot should respond to the user communication. The method further includes providing the second prompt to the second generative model, where the second generative model outputs a null value based upon the second prompt.

(B4) In some embodiments of the method of at least one of (B1)-(B3), the prompt includes: a) the user communication; and b) a previous user communication set forth by the user of the client computing device.

(C1) In yet another aspect, a method disclosed herein includes receiving a user communication set forth by a user of a client computing device, where the user communication is directed towards an environment that includes a first bot and a second bot. The method also includes generating a prompt in response to receiving the user communication, where the prompt includes an instruction to identify at least one bot to which the user communication is directed. The method further includes providing the prompt to a generative model, where the generative model generates an output based upon the prompt, and further where the output indicates that the user communication is directed to the first bot. The method additionally includes causing the first bot to generate a response to the user communication, where the response is caused to be presented on a display of the client computing device as being provided by the first bot.

(C2) In some embodiments of the method of (C1), the output additionally indicates that the user communication is directed to the second bot. The method also includes causing the second bot to generate a second response to the user communication, where the second response is caused to be presented on the display of the client computing device as being provided by the second bot.

(C3) In some embodiments of the method of (C1), the output indicates that the user communication is not directed to the second bot.

(D1) In yet another aspect, a computing system is disclosed herein, where the computing system includes a processor and memory, where the memory stores instructions that, when executed by the processor, cause the processor to perform at least one of the methods disclosed herein (e.g., any of the methods of (A1)-(A1)-(A13), (B1)-(B4), or (C1)-(C3)).

(E1) In still yet another aspect, disclosed herein is a computer-readable storage medium that includes instructions that, when executed by a processor, cause the processor to perform at least one of the methods disclosed herein (e.g., any of the methods of (A1)-(A1)-(A13), (B1)-(B4), or (C1)-(C3)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:

a processor; and memory storing instructions that, when executed by the processor, cause the processor to perform acts comprising:

receiving a user communication set forth by a user of a client computing device, where the user communication is directed towards an environment that includes a first bot and a second bot;

generating a prompt in response to receiving the user communication, where the prompt includes an instruction to identify which of the first bot or the second bot the user communication is directed;

providing the prompt to a generative model, where the generative model generates an output based upon the prompt, and further where the output indicates that the user communication is directed to the first bot; and causing the first bot to generate a response to the user communication, where the response is caused to be presented to a user of the client computing device as being provided by the first bot.

2. The computing system of claim 1, where the output additionally indicates that the user communication is directed to the second bot, the acts further comprising:

causing the second bot to generate a second response to the user communication, where the second response is caused to be presented to the user of the client computing device as being provided by the second bot.

3. The computing system of claim 1, where the output indicates that the user communication is not directed to the second bot.

4. The computing system of claim 1, where the prompt includes:

the user communication; and a previous user communication set forth by the user of the client computing device.

5. The computing system of claim 1, where the prompt includes:

the user communication; and at least one message previously set forth by the first bot.

6. The computing system of claim 1, where the prompt includes:

the user communication; and at least one message previously set forth by the second bot.

7. The computing system of claim 1, where the prompt includes:

contextual data; and a second instruction to summarize the contextual data.

8. The computing system of claim 1, where a second generative model corresponds to the first bot, the acts further comprising:

subsequent to providing the prompt to the generative model, constructing a second prompt, where the second prompt includes the user communication; and providing the second prompt to the second generative model, where the second generative model generates the response based upon the user communication in the second prompt.

9. The computing system of claim 8, where the second prompt additionally includes a previous user communication set forth by the user of the client computing device.

10. The computing system of claim 1, where the user communication fails to identify either the first bot or the second bot.

11. The computing system of claim 1, where the environment is a video game environment.

12. The computing system of claim 1, where the environment is a chat environment.

13. The computing system of claim 1, where the prompt additionally includes locations of the first bot and the second bot in a virtual environment.

14. A method performed by a computing system, the method comprising:

receiving a user communication from a client computing device, where the user communication is directed towards an environment that includes a first bot and a second bot;

generating a prompt for a generative model that corresponds to the first bot, where the prompt is generated in response to receipt of the user communication, and further where the prompt includes an instruction to ascertain whether the user communication is directed to the first bot and if first bot should respond to the user communication;

providing the prompt to the generative model, where the generative model generates a response to the user communication based upon the prompt; and causing the response to be presented to a user of the client computing device as being output by the first bot.

15. The method of claim 14, further comprising:

generating a second prompt for a second generative model that corresponds to the second bot, where the second prompt is generated in response to receipt of the user communication, and further where the second prompt includes a second instruction to ascertain whether the user communication is directed to the second bot and if the second bot should respond to the user communication;

providing the second prompt to the second generative model, where the second generative model generates a second response to the user communication; and causing the second response to be presented to the user of the client computing device as being output by the second bot.

16. The method of claim 14, further comprising:

generating a second prompt for a second generative model that corresponds to the second bot, where the second prompt is generated in response to receipt of the user communication, and further where the second prompt includes a second instruction to ascertain whether the second bot should respond to the user communication; and providing the second prompt to the second generative model, where the second generative model outputs a null value based upon the second prompt.

17. The method of claim 14, where the prompt includes:

the user communication; and a previous user communication set forth by the user of the client computing device.

18. A computer-readable storage medium comprising instructions that, when executed by a processor, cause the processor to perform acts comprising:

receiving a user communication set forth by a user of a client computing device, where the user communication is directed towards an environment that includes a first bot and a second bot;

generating a prompt in response to receiving the user communication, where the prompt includes an instruction to identify which of the first bot or the second bot the user communication is directed;

providing the prompt to a generative model, where the generative model generates an output based upon the prompt, and further where the output indicates that the user communication is directed to the first bot; and causing the first bot to generate a response to the user communication, where the response is caused to be presented on a display of the client computing device as being provided by the first bot.

19. The computer-readable storage medium of claim 18, where the output additionally indicates that the user communication is directed to the second bot, the acts further comprising:

causing the second bot to generate a second response to the user communication, where the second response is caused to be presented on the display of the client computing device as being provided by the second bot.

20. The computer-readable storage medium of claim 18, where the output indicates that the user communication is not directed to the second bot.

* * * * *